United States Patent [19]
Salisbury

[11] 3,975,176

[45] Aug. 17, 1976

[54] METHOD OF SEALING TUBULATION WITH PREFORMED SOLDER GLASS

[75] Inventor: Charles W. Salisbury, Risingsun, Ohio

[73] Assignee: Owens-Illinois, Inc., Toledo, Ohio

[22] Filed: Jan. 2, 1975

[21] Appl. No.: 537,895

[52] U.S. Cl. .......................................... 65/38; 65/43
[51] Int. Cl.² ......................................... C03B 23/24
[58] Field of Search .............. 65/36, 42, 83, 38, 58; 313/220, 217, 221, 188

[56] References Cited
UNITED STATES PATENTS 3,631,287  12/1971  Hochn ............................ 313/109.5

Primary Examiner—Arthur D. Kellogg
Attorney, Agent, or Firm—Donald Keith Wedding

[57] ABSTRACT

The glass tubulation of a gaseous discharge display device or similar device can be advantageously sealed to a glass substrate by using a preformed vitreous or devitrifiable solder glass annular member such as a washer which is placed over the tubulation and subjected to the normal solder glass sealing cycle to make the final seal.

9 Claims, No Drawings

METHOD OF SEALING TUBULATION WITH PREFORMED SOLDER GLASS

BACKGROUND OF THE INVENTION

This invention relates to the manufacture of gas discharge devices, especially A.C. (alternating current) multiple gas discharge display/memory devices which have an electrical memory and which are capable of producing a visual display or representation of data such as numerals, letters, radar displays, aircraft displays, binary words, educational displays, etc.

Multiple gas discharge display and/or memory panels of one particular type with which the present invention is concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member typically being appropriately oriented so as to define a plurality of discrete gas discharge units or cells.

In some prior art panels the discharge cells are additionally defined by surrounding or confining physical structure such as apertures in perforated glass plates and the like so as to be physically isolated relative to other cells. In either case, with or without the confining physical structure, charges (electrons, ions) produced upon ionization of the elemental gas volume of a selected discharge cell, when proper alternating operating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of substantial conductive current from the conductor member to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge cells is disclosed in U.S. Pat. No. 3,499,167 (incorporated herein by reference) issued to Theodore C. Baker, et al.

An example of a panel containing physically isolated cells is disclosed in the article by D. L. Bitzer and H. G. Slottow entitled "The Plasma Display Panel — A Digitally Addressable Display With Inherent Memory", Proceeding of the Fall Joint Computer Conference, IEEE, San Francisco, California, Nov. 1966, pages 541-547 and also in U.S. Pat. No. 3,559,190 (incorporated herein by reference).

In the construction of the panel, a continuous volume of ionizable gas is confined between a pair of dielectric surfaces backed by conductor arrays typically forming matrix elements. The two conductor arrays may be orthogonally related sets of parallel lines (but any other configuration of conductor arrays may be used). The two arrays define at their intersections a plurality of opposed pairs of charge storage areas on the surfaces of the dielectric bounding or confining the gas. Thus, for a conductor matrix having H rows and C columns the number of elemental or discrete areas will be twice the number of elemental discharge cells.

In addition, the panel may comprise a so-called monolithic structure in which the conductor arrays are created on a single substrate and wherein two or more arrays are separated from each other and from the gaseous medium by at least one insulating member. In such a device the gas discharge takes place not between two opposing elemental areas on two different substrates, but between two contiguous or adjacent elemental areas on the same substrate; the gas being confined between the substrate and an outer retaining wall.

It is also feasible to have a gas discharge device wherein some of the conductive or electrode members are in direct contact with the gaseous medium and the remaining electrode members are appropriately insulated from such gas, i.e., at least one insulated electrode.

In the prior art there exists D.C. (direct current) devices where the electrodes consist of an anode and a cathode which are typically in direct contact with the ionizable gaseous medium. It is also possible to construct such D.C. devices utilizing a dielectric overcoat, i.e., the same structure and configuration as an A.C. gas discharge display/memory panel described hereinbefore.

A wide variety of such devices exist in the prior art. Examples of such devices are disclosed in U.S. Pat. Nos. 2,142,106; 3,260,880; 3,720,452; 3,725,713; 3,237,040, and 3,497,751, all of which are incorporated herein by reference.

The present invention is intended to relate to the manufacture of all types of A.C. and D.C. display panels.

In addition to the matrix configuration, the conductor arrays of the display device (D.C. or A.C.) may be shaped otherwise. Accordingly, while the preferred conductor arrangement is of the crossed grid type as discussed herein, it is likewise apparent that where a maximal variety of two dimensional display patterns is not necessary, as where specific standardized visual shapes (e.g., numerals, letters, words, etc.) are to be formed and image resolution is not critical, the conductors may be shaped accordingly (e.g., a segmented digit display).

The gas is selected to produce visible light and invisible radiation which may be used to stimulate a phosphor (if visual display is an objective) and a copious supply of charges (ions and electrons) during discharge.

In the prior art, a wide variety of gases and gas mixtures have been utilized as the gaseous medium in a number of different gas discharge devices. Typical of such gases include pure gases and mixture of Co; $CO_2$; halogens; nitrogen; $NH_3$; oxygen; water vapor; hydrogen; hydrocarbons; $P_2O_5$; boron fluoride; acid fumes; $TiCl_4$; air; $H_2O_2$; vapors of sodium, mercury, thallium, cadmium, rubidium, and cesium; carbon disulfide; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; and the so-called rare or inert Group VIII gases.

To obtain uniform resolution over the entire display surface of a gas discharge panel, it is imperative that the space between opposing walls of the gas envelope be uniform and that the walls of the chamber be sealed to provide a gas filled container.

Several methods of sealing such panels with various spacers therebetween appear in the prior art. For example, epoxy has been used as a sealant but produces impurities in the gas mixture which decreases the life of the panel. In situ fabrication of gas panels with granular solder glass as a sealant and spacers has also been utilized but uniform deposition of the solder glass is difficult and considerable numbers of cells are obliterated. In order to resolve these problems a soft glass rod or granular sealant and a hard glass rod spacer as has been used, as described in U.S. Pat. No. 3,778,127 (incorporated herein by reference) wherein the upper plate of the gas panel settles upon the spacing rods during a bakeout operation thus establishing a predetemined and uniform spacing within the envelope. However, such glass spacers are rigid, tend to crack and are detrimentally conspicuous to the observer.

Another glass sealing composition especially suitable for sealing together the two glass substrates of a multiple gas discharge display panel so as to provide a hermetically sealed ionizable gas chamber is disclosed in U.S. Pat. No. 3,734,702 (incorporated herein by reference) comprising a lead borosilicate solder glass containing 18% by weight of aluminum titanate which inhibits crystallization thus developing a seal with even stress concentration.

Solder glass compositions of various types have been used in the past to seal one glass surface to another glass surface as for example the sealing of the glass face plate and funnel components of a color television picture tube bulb. Similarly, these compositions in the form of pastes utilizing nitrocellulose and amyl acetate as the solvent-binder system have been used to seal the glass substrates of gaseous discharge display devices as well as sealing the exhaust tube to one of the substrates. Typical of such conventional practice is the procedure described in U.S. Pat. No. 3,127,278 and the composition set forth in U.S. Pat. No. 3,088,834. Other solder glass compositions incorporating both vitreous and devitrifiable glass are set forth in U.S. Pat. Nos. 3,250,631 and 3,778,242 hereby incorporated by reference.

A particularly vexatious problem in the manufacture of a gas display device has been the sealing of the glass substrate and the glass tubulation by which the device is filled with gas. When vitreous or crystalizing solder glasses in the form of a paste is used, particulate glass from the seal penetrates the glass panel or substrate during the sealing process and acts as an impurity in the panel thus inhibiting satisfactory operation. Mixing of the paste and application is time consuming. Furthermore, in sealing the exhaust tube to the substrate, gases such as air become entrapped in the panel causing bubbles and voids which must be meticulously avoided. As a result, there is a great need for improvement in the tubulation sealing techniques described in the prior art.

SUMMARY OF THE INVENTION

Until now, sealing glass has always been used as a paste but never preformed into various solid shapes and sizes as have metals such as aluminum, copper, nickel, steel, zinc, lead and brazing alloys. Such preforming eliminates mixing the solder glass with the vehicle, reduces assembly time and provides a rapid and clean method of making tubulation seals while providing a uniform amount of sealing material for each individual panel.

The present invention contemplates a new article of manufacture prepared by casting molten vitreous or devitrifiable solder glass compositions into glassy state solid rods or drawing such compositions into tubing. The rods or tubing are then cut or drilled into doughnut shaped washers which can be slipped over the tubulation of a gaseous discharge display device so that the preformed washer rests on the glass substrate. The process of sealing is then completed by subjecting the substrate to a sealing cycle which melts the solder glass and unites the substrate and glass tubulation. If desired, gradient seals can be made by alternating the preformed washers made of various types of solder glass with different melting properties.

DESCRIPTION OF THE PREFERRED EMBODIMENTS

The solder glass compositions used in this invention can be any of those which are commercially available whether of the vitreous or devitrifiable type. $PbO-B_2O_3-ZnO$ solder glasses of the vitreous type are preferred. These glasses have the property of softening and flowing at temperatures within the range of 400°–500°C. and preferably below 475°C. Typical of such compositions are those containing on a weight basis from 72 to 82% PbO, 4 to 14% ZnO, 6 to 15% $B_2O_3$, 1 to 13% $SiO_2$ and 0 to 2% BaO.

Other illustrative glass compositions which can be preformed into rings or washers include the following weight percentages of ingredients.

|  | A | B | C | D |
|---|---|---|---|---|
| % PbO | 73.3 | 72.0 | 72.0 | 74.4 |
| % $B_2O_3$ | 13.4 | 15.0 | 15.0 | 15.0 |
| % $SiO_2$ | 13.3 | 4.0 | 2.0 | 3.2 |
| % $Al_2O_3$ |  | 5.0 | 5.0 | 7.4 |
| % ZnO |  | 4.0 | 6.0 |  |

To prepare the preformed solder glass washers used in the sealing of tubulation to a glass substrate, a melt containing the weight percent of each oxide hereinbefore designated is cast into solid rods of various diameters from ¼ inch to 1 inch and then sliced into discs of various thicknesses from ¼ inch to ½ inch. The discs are thereafter center drilled with hole diameters such that they can be placed over the tubulation. If desired, the melt can be conveniently formed into hollow tubing of various diameters and then cut into rings which are placed over the exhaust tube before subjecting them to the sealing cycle. Shapes other than rings such as triangles, squares, rectangles, etc. are satisfactory as long as the center hole is large enough so that the preformed member can be telescoped over the tubing to be sealed.

Once the solder glass is preformed in the shape of a donut or washer, the tubing is inserted in a cavity of the glass substrate and the washer or other annular member placed over the tubing in contact with said substrate. The assembly is then heated at 5°F. per minute up to about 750°F. to 960°F., depending on the recommended sealing temperature for the solder glass washer used and held at that temperature for 1 hour followed by cooling at 3°F. per minute to room temperature thus causing the glass to flow and seal the tubing to the substrate without any voids or bubbles forming and no contamination.

The examples which follow further illustrate the invention but are not to be construed as limiting.

EXAMPLE 1

Composition A was melted and cast into rods ½ inch in diameter. The rods were then sliced into discs ¼ inch in length. The discs were then center drilled with hole diameters slightly larger than the outside diameter of the tubulation which was ⅛ inch. One of the solder glass washers thus prepared was telescoped over the tubulation of a gaseous discharge display panel and the entire assembly heated at a rate of 5°F. per minute up to 960°F. and held at that temperature for 1 hour. The assembly was finally cooled at a rate of 3°F. per minute to room temperature. The seal formed was free of voids or bubbles and adhered tenaciously to the glass substrate of the display panel. No leaks were detected in the tubulation joint when the assembly was filled with gas.

EXAMPLE 2

The same procedure and heating cycle described in Example 1 was employed except that composition B was used and cast into solid rods which were center drilled. No contamination of the inside of the gas panel was visible after the sealing operation and no leaks were detected.

EXAMPLE 3

Composition C was melted and drawn into hollow tubes with an inside diameter of ¼ inch. The tubes were cut into annular members about ½ inch long. The resulting rings were used to seal the glass tubulation to the glass substrate of a gaseous display device consisting of an array of conductors formed on each of a pair of substrates with a dielectric formed over each of the conductor arrays. The two substrates were positioned so that the conductor arrays were orthogonal to each other and the entire assembly was edge sealed before attachment of the tubulation. The assembly was heated at a constant rate of about 3°F. per minute up to a temperature of 900°F. After holding at that temperature for 1 hour, the assembly was cooled at the same constant rate to room temperature. The seal formed was satisfactory in every respect and particularly was devoid of bubbles, cracks or inclusion of foreign matter.

EXAMPLE 4

Composition D was melted and cast into a solid bar one inch square. The rod was cut into ¼ inch lengths and a ¼ inch hole was drilled through the center of each segment. One of the drilled segments was placed over the glass tubulation of a gaseous discharge display panel and a glass segment prepared in similar fashion comprising 80 weight% PbO, 8 weight percent $B_2O_3$, 9 weight percent ZnO and 3 weight percent $SiO_2$, placed over the first segment. When subjected to the heating cycle described in Example 1, the preformed segments softened and formed an excellent gradient seal between the tubulation and the display panel.

What I claim is:

1. In the method of sealing the glass tubulation, inserted in a cavity of the glass substrate of a gaseous discharge display device, to the glass substrate with a solder glass by the application of heat, the improvement comprising preforming said solder glass into a homogeneous solidified glass annular member larger than said cavity and having a whole size slightly larger than the outside size of said tubulation, telescoping said annular member over the tubulation and bringing said annular member into overlying relationship and contact with said substrate, such that said annular member rests on the surface of said substrate, subjecting the entire display device to an elevated temperature sufficient to cause said solder glass of said annular member to flow and seal the substrate to the glass tubulation without voids or bubbles forming and no contamination but insufficient to cause deformation of said substrate and tubulation and cooling said display device.

2. A method as in claim 1 in which a vitreous solder glass is employed.

3. A method as in claim 1 in which a devitrified solder glass is employed.

4. A method as in claim 1 in which the display device is heated at a constant rate of from 3° to 5°F. per minute to a maximum of 750° to 960°F., held at the predetermined temperature for about 1 hour and then cooled at the same constant rate to room temperature.

5. A method as in claim 1 in which the solder glass employed contains on a weight basis from 72 to 82% PbO, 4 to 14% ZnO, 6 to 15% $B_2O_3$, 1 to 13% $SiO_2$ and 0 to 2% BaO.

6. A method as in claim 5 in which the solder glass employed contains on a weight basis 73.3% PbO, 13.4% $B_2O_3$ and 13.3% $SiO_2$.

7. A method as in claim 1 in which the solder glass employed contains on a weight basis 72% PbO, 15% $B_2O_3$, 4% $SiO_2$, 5% $Al_2O_3$ and 4% ZnO.

8. A method as in claim 1 in which the solder glass employed contains on a weight basis 72% PbO, 15% $B_2O_3$, 2% $SiO_2$, 5% $Al_2O_3$ and 6% ZnO.

9. A method as in claim 1 in which the solder glass employed contains on a weight basis 74.4% PbO, 15.0% $B_2O_3$, 3.2% $SiO_2$ and 7.4% $Al_2O_3$.

* * * * *